United States Patent

[11] 3,528,363

[72] Inventor Sherman H. Creed
 San Jose, California
[21] Appl. No. 754,632
[22] Filed Aug. 22, 1968
[45] Patented Sept. 15, 1970
[73] Assignee FMC Corporation
 San Jose, California
 a corporation of Delaware

[54] CONTAINER HANDLING APPARATUS
 8 Claims, 4 Drawing Figs.
[52] U.S. Cl. .................................................. 99/365
[51] Int. Cl. .............................................. A23l 3/00,
 B65g 29/00

[50] Field of Search .................................. 198/211,
 212; 99/365

[56] References Cited
 UNITED STATES PATENTS
 1,551,133 8/1925 Chapman .................... 99/365X Primary Examiner—Edward A. Sroka
Attorneys—F. W. Anderson and C. E. Tripp ABSTRACT: A reel and spiral cooker having a reel supporting mechanism in the form of an endless flexible band disposed intermediate the ends of the cooker to prevent excessive deflection of the reel at its longitudinal midpoint and to permit use of reels that are more than twice as long as reels supported only at their ends.

Patented Sept. 15, 1970
3,528,363
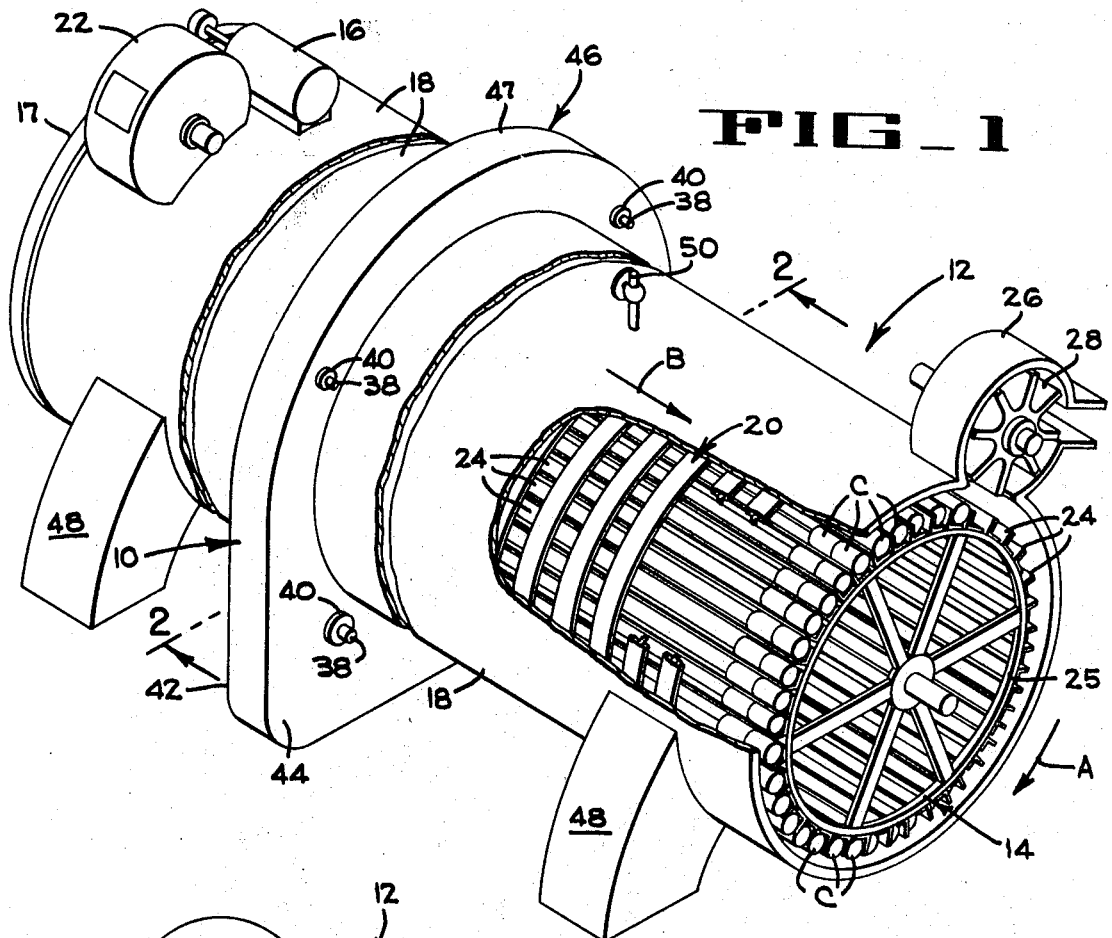
FIG_1
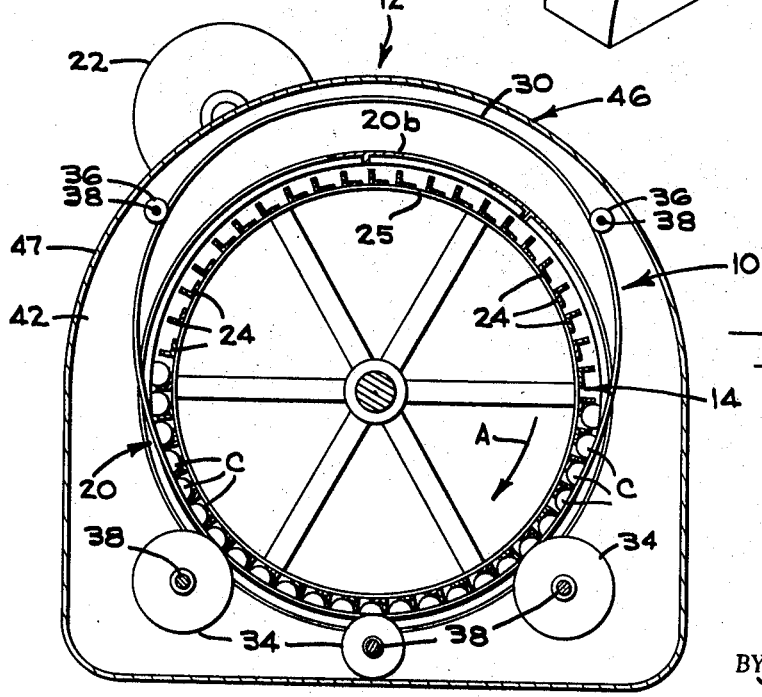
FIG_2
INVENTOR.
SHERMAN H. CREED
BY F. W. Anderson
C. E. Tripp
ATTORNEYS

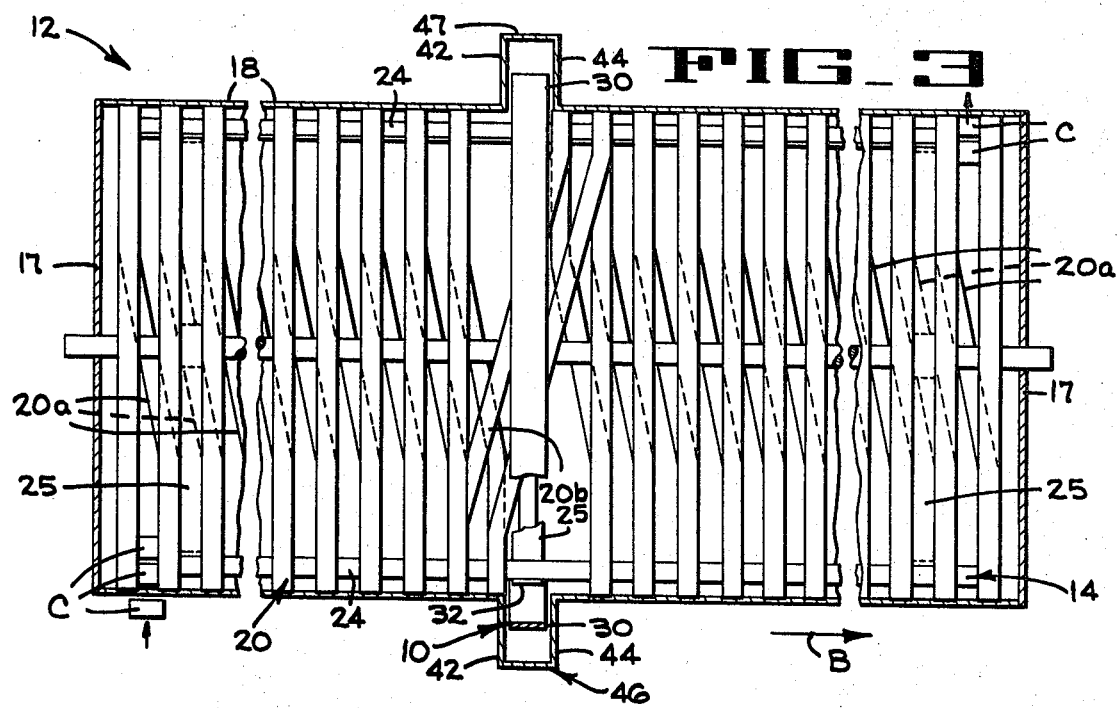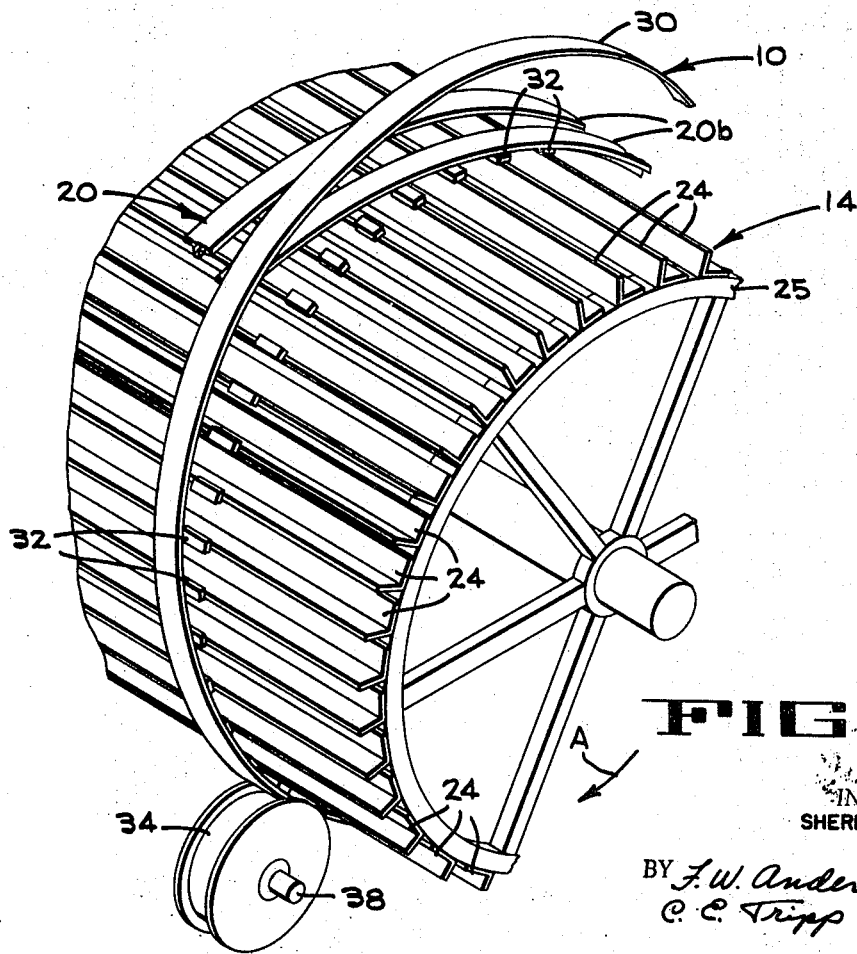

3,528,363

CONTAINER HANDLING APPARATUS

CROSS-REFERENCE TO RELATED APPLICATION

Assignees copending application of James L. Reimers, Ser. No. 754,631, covers a rotary cooker similar to the subject cooker and was filed on even date herewith.

BACKGROUND OF THE INVENTION

Reel and spiral cookers of the type disclosed in U.S. Letters Pat. No. 2,536,116 to Wilbur have been manufactured for many years with their reels supported for rotation only at their opposite ends. These cookers have been standardized at a length of about 39 feet because the weight of the reel and container supported thereby cause the reel to deflect about three thirty-seconds inch at mid-span. If longer reels were used, much greater deflections could be expected with the amount of deflection varying in direct proportion to the weight and by the third power of the over-all length. If the deflection at mid-span became too large, the containers moving along the upper periphery of the reel would deflect out of engagement with the stationary spiral thus causing can jams.

SUMMARY OF THE INVENTION

The reel supporting mechanism of the present invention includes an endless flexible band which engages and supports the lower peripheral portion of the reel at the longitudinal midpoint thereof, and accordingly prevents deflection of the reel at that point. The upper portion of the flexible band projects well above the upper periphery of the reel so as to permit containers to be moved from one side of the band to the other side thereof without interference. If the reel is to be longer than twice the standard 39 foot length, then a plurality of reel supporting mechanisms may be spaced at even intervals along the length of the reel.

BRIEF DESCRIPTION OF THE DRAWINGS

FIG. 1 is a diagrammatic perspective of the reel and spiral cooker of the present invention with certain portions broken away to foreshorten the view and with other portions at the discharge end also broken away to show the reel and spiral therein.

FIG. 2 is a vertical section taken along lines 2—2 of FIGS. 1 and 3 illustrating the manner in which the reel supporting mechanism engages and supports the reel.

FIG. 3 is a diagrammatic plan of the spiral track illustrating a top spiral lead portion which moves the containers from one side of the supporting mechanism to the other without mechanical interference.

FIG. 4 is a perspective of a greatly foreshortened portion of the reel and supporting mechanism illustrating the manner in which the upper lead portion of the spiral track causes the containers to move from one side of the supporting mechanism to the other side thereof without interference, said view also illustrating a wheel.

DESCRIPTION OF PREFERRED EMBODIMENT

The reel supporting mechanism 10 (FIGS. 1 and 2) of the present invention is associated with the well known type reel and spiral heat treatment apparatus 12 and is used in order to permit the use of longer apparatus than was heretofore possible, by supporting the central portion of the reel 14 thus preventing excessive deflection of the reel at its midpoint. Although the reel supporting mechanism 10 of the heat treatment apparatus 12 will be described in conjunction with a rotary pressure cooker, it will, of course, be understood that the mechanism 10 operates equally well with rotary cookers or coolers which are either of the pressure type or are open to the atmosphere.

The heat treatment apparatus or cooker 12 comprises a reel 14 which is continuously driven by a motor 16 in a clockwise direction as indicated by the arrows A in FIGS. 1 and 2. The reel 14 is journaled in end walls 17 (FIG. 3) of a housing which includes a cylindrical shell 18. A generally spiral track 20 of T-shaped cross-section is secured to the inner surface of the shell 18 and extends throughout the entire length of the shell. Containers C are fed into the housing, one at a time, between adjacent runs of the spiral track 20 by means of a continuously driven pressure feed valve 22. The containers C are received in elongated angle bars or carriers 24 which extend the full length of the housing and are equally spaced along the outer periphery of spaced wheels 25 of the reel 14. The carriers 24 and wheels 25 constitute a part of the reel, and one wheel 25 (FIG. 3) is aligned with the reel supporting mechanism 10.

The containers are advanced longitudinally of the reel in the direction of the arrow B (FIG. 1 and 3) by the continuously rotating reel 14 between adjacent runs of the spiral track 20 which causes the containers to be moved longitudinally of the axis of the reel 14. In this way the containers are moved spirally within the cylindrical shell 18 to a continuously driven pressure discharge valve 26 which includes a pocketed rotor 28 sealed to the rotor housing. The discharge valve 26 then discharges the processed containers from the heat treatment apparatus 12.

The apparatus 12 is of the type disclosed in the patent to Wilbur 2,936,116 and reference may be had to said patent for a more complete description of the drive parts, and other components not described in detail herein or essential to the invention.

The reel supporting mechanism 10 comprises an endless flexible metal band 30 which surrounds the reel 14 at its longitudinal midpoint and has an inner peripheral surface which is somewhat larger than the outer peripheral surface of the reel. The lower portion of the band 30 engages wear blocks 32 (FIG. 4) secured to the carriers 24 of the reel and is bent to conform to the curvature of the lower portion of the path of movement of the wear blocks by a plurality of flanged supporting rollers 34, three supporting rollers being illustrated in FIG. 2. The band 30 thus assumes a generally oval configuration with its upper portion being guided by flanged guide rollers 36. The rollers 34 and 36 are keyed to shafts 38 journaled in suitable bearings 40 (FIG. 1) secured to spaced walls 42 and 44 of a pressure tight housing 46 which includes a removable inverted U-shaped wall 47. The cylindrical shell 18 is preferably made in two sections with one end of one section secured, as by bolting, to the wall 42, and one end of the other section secured to the wall 44. It will also be understood that walls 42 and 44 cooperate with legs 48 to support the shell 18 and housing 46.

It is obvious that the roller 34, if used without the band 30, would not provide adequate support for the reel since the convex surfaces of the rollers mate with the convex surface of the path of movement of the wear blocks and accordingly provide line contact. Also, since the wear blocks do not define a continuous cylindrical surface but are spaced from each other, the reel would vibrate vertically each time a wear block moved past one of the rollers 34. In contrast, use of the band 30 in combination with the rollers 34 provides continuous support for the reel for approximately the lower 90° of the reel thereby eliminating any tendency for the reel to vibrate vertically.

The band 30, wear blocks 32, and one of the reel supporting wheels 25 are mounted in a common vertical plane, which plane is located at the longitudinal midpoint of the cooker 12 if the cooker is less than twice the standard cooker length of 39 feet. If it is desired to construct a cooker longer than twice the standard length, it will be apparent that a plurality of reel supporting mechanisms 10 may be provided at spaced intervals along the cooker thus preventing excessive deflection of the reel regardless of the length of the cooker.

As indicated in FIG. 2, the lower portion of the flexible band 30 is disposed in the path of movement of the containers C that are in the lower portion of the cooker. In order to prevent interference between the band 30 and the containers C, the spiral track 20 includes a plurality of parallel concentric ring fragments interconnected at their lower ends to bottom lead portions 20a (FIG. 3). These bottom lead portions 20a are preferably positioned within about the bottom 100° of the cylindrical shell 18. Since the containers cannot move past the band 30 while moving around the lower half of the cooker, a lead portion 20b (FIGS. 3 and 4) of the track 20 is provided in the upper half of the cooker, which upper lead portion 20b moves the containers past the vertical plane of the band 30.

In operation, a heat treatment medium under superatmospheric pressure is directed in the shell 18 through valued conduit 50 and containers C are continuously fed into the rotary pressure feed valve 22 (FIGS. 1 and 2) which deposits the containers in the angle bars 24 of the reel 14. The continuously driven reel 14 moves the containers about the reel axis while the spiral track 20 advances the containers longitudinally of the reel in the direction indicated by arrow B in FIG. 1. As the containers approach the plane of the flexible band 30, they enter the upper lead portion 20b (FIGS. 3 and 4) of the track 20 and are moved from one side of the vertical plane of the band 30 to the other without interference. The containers then continue along the spiral track 20 until they are discharged from the cooker by the continuously driven rotary discharge valve 24.

An important feature of the invention is that the flexible band 30 supports the elongated reel at its longitudinal midpoint, and in the plane of one of the wheels 25, thereby preventing deflection of the reel in this plane and permitting the use of much longer reels than have heretofore been possible. If the flexible band should break, another band may be threaded into the housing 46, after first removing the inverted U-shaped wall 47, and the ends of the band may then be butt welded together to form an endless flexible metal band.

It is apparent from the foregoing description that the heat treatment apparatus of the present invention includes a reel supporting mechanism provided with an endless flexible metal band which supports the lower half of the reel intermediate its ends thus preventing deflection of the reel at this point. The apparatus also includes a spiral track which has an upper lead portion that allows the containers to move below the upper portion of the band and to pass from one side of the plane of the endless flexible band to the other side without interference.

Although the best mode contemplated for carrying out the present invention has been herein shown and described it will be apparent that modifications and variations may be made without departing from what is regarded to be the subject matter of the invention as set forth in the appended claims.

I claim:

1. A container handling apparatus comprising an elongated housing having an inlet end and a discharge end, a driven elongated reel mounted for rotation in said housing and having a plurality of container receiving carriers on the periphery thereof, feed means for directing containers into said carriers adjacent said inlet end, a generally spiral track disposed within said housing and externally of said reel for moving the containers from said inlet end of said housing to said discharge end, means for discharging the containers from said carriers adjacent the other end of said housing, and reel supporting means disposed intermediate the ends of said housing for supporting said reel to preclude mid-span deflection of said reel, said reel supporting means including an endless flexible metal band trained around the lower portion of said reel, and rotatable support means for maintaining the reel supporting portion of said band in supporting engagement with the lower portion of said reel thereby preventing deflection of said reel.

2. An apparatus according to claim 1 wherein said metal band is trained around said reel and is substantially larger in peripheral dimension than said reel, said upper portion of said band being spaced from the upper portion of said reel.

3. An apparatus according to claim 2 and additionally including guide means disposed in position to engage and guide the upper portion of said metal band.

4. An apparatus according to claim 3 wherein said rotatable supporting means and said guide means are flanged rollers journaled for free rotation.

5. An apparatus according to claim 3 wherein said flexible metal band lies in a vertical plane and engages the lower portion of the reel, and wherein an upper portion of said reel is spaced from said band, said spiral track including a plurality of turns on both sides of said plane of said band with lead portions at the lower ends thereof, said spiral track also including an upper lead portion for passing the containers from one side of said vertical plane to the other.

6. An apparatus according to claim 5 wherein wear blocks are secured to the outer periphery of each carrier of said reel and lie in said vertical plane, and wherein said endless flexible band engages said wear blocks.

7. An apparatus according to claim 3 wherein said elongated housing is a pressure tight housing; wherein said reel, band, and spiral track are confined within said housing; and wherein said feed means and discharge means are rotary pressure valves; and means for directing a heat treatment medium under superatmospheric pressure into said housing.

8. An apparatus according to claim 6 wherein said elongated housing is a pressure tight housing; wherein said reel, band, and spiral track are confined within said housing; and wherein said feed means and discharge means are rotary pressure valves; and additionally comprising means for directing a heat treatment medium under superatmospheric pressure into said housing.